US012801270B2

(12) United States Patent
Zhang

(10) Patent No.: US 12,801,270 B2
(45) Date of Patent: Nov. 17, 2026

(54) SCREEN MAGNIFICATION BASED ON DETERMINED DISTANCE BETWEEN USER AND SCREEN

(71) Applicant: HUIZHOU TCL MOBILE COMMUNICATION CO., LTD., Huizhou (CN)

(72) Inventor: Hong Zhang, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 270 days.

(21) Appl. No.: 18/711,442

(22) PCT Filed: Oct. 31, 2022

(86) PCT No.: PCT/CN2022/128603

§ 371 (c)(1),
(2) Date: May 17, 2024

(87) PCT Pub. No.: WO2023/088081

PCT Pub. Date: May 25, 2023

(65) Prior Publication Data

US 2025/0021219 A1 Jan. 16, 2025

(30) Foreign Application Priority Data

Nov. 19, 2021 (CN) ........................ 202111384354.7

(51) Int. Cl.
*G06F 3/04845* (2022.01)
*G06F 3/01* (2006.01)
(Continued)

(52) U.S. Cl.
CPC .......... *G06F 3/04845* (2013.01); *G06F 3/012* (2013.01); *G06F 3/0481* (2013.01);
(Continued)

(58) Field of Classification Search
CPC .... G06F 3/04845; G06F 3/012; G06F 3/0481; G06F 3/04842; G06F 2203/04806;
(Continued)

(56) References Cited

U.S. PATENT DOCUMENTS 5,649,188 A * 7/1997 Nomura .................. G06F 16/93
6,002,386 A * 12/1999 Gu ..................... H04N 21/4318
348/E5.119
(Continued)

FOREIGN PATENT DOCUMENTS

CN 102880438 A 1/2013
CN 103024163 A 4/2013
(Continued)

OTHER PUBLICATIONS

European Office Action issued in corresponding European Patent Application No. 22894618.2 dated Oct. 1, 2025, pp. 1-9.
(Continued)

*Primary Examiner* — Kenny Nguyen
(74) *Attorney, Agent, or Firm* — PV IP PC; Wei Te Chung

(57) ABSTRACT

A screen zoom-in processing method and apparatus based on a mobile terminal, and a terminal and a medium. The method comprises: detecting and acquiring an application, which is started in a mobile terminal, and determining whether the currently started application is an application of a preset specified type; when the currently started application is an application of the preset specified type, then acquiring and detecting the distance from the face of a user to a screen of the mobile terminal; when the distance from the face of the user to the screen of the mobile terminal is less than a predetermined distance, then automatically prompting whether to start a screen zoom-in function; and when an instruction for selecting to start the screen zoom-in function
(Continued)

is detected, then controlling the screen of the mobile terminal to zoom in for display according to a predetermined coefficient.

18 Claims, 2 Drawing Sheets

(51) Int. Cl.
*G06F 3/0481* (2022.01)
*G06F 3/04842* (2022.01)
*G06T 7/50* (2017.01)

(52) U.S. Cl.
CPC ............ *G06T 7/50* (2017.01); *G06F 3/04842* (2013.01); *G06F 2203/04806* (2013.01); *G06T 2207/30201* (2013.01)

(58) Field of Classification Search
CPC .... G06F 1/1626; G06F 1/1686; G06F 1/3218; G06F 1/3278; G06F 1/3287; G06F 9/451; G06F 3/0482; G06F 3/0487; G06F 9/44505; G06F 3/0484; G06T 7/50; G06T 2207/30201; H04M 2250/52; H04M 1/72454; H04M 1/72481
See application file for complete search history.

(56) References Cited

U.S. PATENT DOCUMENTS

| | | | | |
|---|---|---|---|---|
| 9,160,915 | B1 * | 10/2015 | Davies | G06F 1/1626 |
| 9,390,032 | B1 * | 7/2016 | Baldwin | G06F 13/00 |
| 9,582,851 | B2 * | 2/2017 | Raman | G06F 3/012 |
| 10,265,218 | B2 * | 4/2019 | Rollend | A61F 9/08 |
| 10,891,688 | B1 * | 1/2021 | Clausen | G06F 3/0481 |
| 11,430,414 | B2 * | 8/2022 | Grieves | G09G 5/373 |
| 11,915,671 | B2 * | 2/2024 | Grieves | G06F 3/04842 |
| 2010/0309315 | A1 | 12/2010 | Hogasten | |
| 2012/0188285 | A1 * | 7/2012 | Friedlander | G06F 3/043 345/157 |
| 2014/0118257 | A1 * | 5/2014 | Baldwin | G06F 3/017 345/158 |
| 2014/0137054 | A1 * | 5/2014 | Gandhi | G06F 3/013 715/865 |
| 2015/0046802 | A1 * | 2/2015 | Liang | G06F 16/9577 715/255 |
| 2015/0242993 | A1 * | 8/2015 | Raman | G06F 3/012 345/589 |
| 2018/0040296 | A1 * | 2/2018 | Zhan | G06F 3/0416 |
| 2018/0121711 | A1 * | 5/2018 | Ge | G06F 3/0484 |
| 2018/0205911 | A1 | 7/2018 | Siminoff | |
| 2021/0117048 | A1 * | 4/2021 | Grieves | G06F 3/01 |
| 2021/0118410 | A1 * | 4/2021 | Grieves | G09G 5/373 |
| 2021/0122242 | A1 * | 4/2021 | Ding | B60K 35/10 |
| 2021/0233500 | A1 * | 7/2021 | Sinha | G06F 3/013 |
| 2022/0366874 | A1 * | 11/2022 | Grieves | G06F 1/1605 |
| 2024/0004982 | A1 * | 1/2024 | Fang | H04M 1/72463 |

FOREIGN PATENT DOCUMENTS

| | | | |
|---|---|---|---|
| CN | 103716516 | A | 4/2014 |
| CN | 104636097 | A | 5/2015 |
| CN | 104866082 | A | 8/2015 |
| CN | 105759974 | A | 7/2016 |
| CN | 106406742 | A | 2/2017 |
| CN | 106791135 | A | 5/2017 |
| CN | 107479694 | A | 12/2017 |
| CN | 107562180 | A | 1/2018 |
| CN | 107835304 | A | 3/2018 |
| CN | 108989571 | A | 12/2018 |
| CN | 109388367 | A | 2/2019 |
| CN | 109558008 | A | 4/2019 |
| CN | 109656371 | A | 4/2019 |
| CN | 109656498 | A | 4/2019 |
| CN | 110162232 | A | 8/2019 |
| CN | 110519443 | A | 11/2019 |
| CN | 111048039 | A | 4/2020 |
| CN | 111124195 | A | 5/2020 |
| CN | 111225269 | A | 6/2020 |
| CN | 112954212 | A | 6/2021 |
| CN | 113132642 | A | 7/2021 |
| CN | 114253623 | A | 3/2022 |

OTHER PUBLICATIONS

Notification to Grant Patent Right for invention issued in corresponding Chinese Patent Application No. 202111384354.7 dated Nov. 21, 2023.
International Search Report in International application No. PCT/CN2022/128603, mailed on Dec. 23, 2022.
Written Opinion of the International Search Authority in International application No. PCT/CN2022/128603,mailed on Dec. 23, 2022.
Chinese Office Action issued in corresponding Chinese Patent Application No. 202111384354.7 dated Jul. 25, 2023, pp. 1-13.

* cited by examiner

SCREEN MAGNIFICATION BASED ON DETERMINED DISTANCE BETWEEN USER AND SCREEN

This application is a US national phase application based upon an International Application No. PCT/CN2022/128603, filed on Oct. 31, 2022, which claims priority to Chinese Application No. 202111384354.7, entitled "SCREEN ZOOM-IN PROCESSING METHOD AND APPARATUS BASED ON MOBILE TERMINAL, AND TERMINAL AND MEDIUM", filed on Nov. 19, 2021. The entire disclosures of the above applications are incorporated herein by reference.

FIELD OF THE INVENTION

The present disclosure relates to a mobile terminal, and more particularly, to a screen enlargement processing method, a device, a mobile terminal and a storage medium based on a mobile terminal.

BACKGROUND

With the development of science and technology and the continuous improvement of people's living standards, the use of various mobile terminals such as mobile phones is becoming more and more popular, and mobile phones have become an indispensable communication and entertainment tool in people's lives.

People often use mobile browser applications, chat applications, reading applications, etc. With the aging of society, when the mobile phone user is an elderly person with poor eyesight, some pages often have to be close to the elderly to see clearly. The conventional mobile terminal, such as the auxiliary function of mobile phone, has a screen magnification function, but the menu is deeply hidden, is not easy to use, and is inconvenient to operate especially for the elderly.

Therefore, this still needs to be improved and enhanced.

SUMMARY

Technical Problem

One objective of an embodiment of the present disclosure is to provide a screen enlargement processing method, a device, a mobile terminal and a storage medium based on a mobile terminal. The auxiliary function of the mobile terminal such as a conventional mobile phone is designed to solve the screen magnification function, but the menu is hidden deeply, is not easy to use, and the operation is inconvenient for the elderly. The present disclosure provides a method for determining the distance between the user and the screen by using the front-facing camera and automatically prompting the user to turn on the magnification function, which is provided for users with insufficient eyesight. The present disclosure uses the front camera of the mobile terminal to determine whether the current user is close to the screen, and when the user is close to the screen at a predetermined distance, a prompt pop up is automatically generated to enable the screen magnification function, which provides convenience to the user.

SOLUTION TO TECHNICAL PROBLEM

Technical Solution

In order to solve the above-mentioned technical problems, the technical scheme adopted in the present disclosure is as follows:

According to an embodiment of the present disclosure, a screen magnification processing method based on a mobile terminal is disclosed. The method comprises:

detecting and obtaining an application opened by the mobile terminal, and determining whether the currently opened application is a preset application of a specified type;

when the currently opened application is the preset application of the specified type, obtaining a distance from a user's face to a screen of the mobile terminal;

when the distance from the user's face to the screen of the mobile terminal is less than a predetermined distance, automatically prompting whether to enable a screen magnification function;

when the user selects to enable the screen magnification function, controlling the mobile terminal screen to display a magnified image in a predetermined magnification rate.

According to another embodiment of the present disclosure, before the detecting and obtaining an application opened by the mobile terminal, and determining whether the currently opened application is a preset application of a specified type, the method further includes:

setting the preset application of the specified type on the mobile terminal in advance, wherein the preset application of the specified type comprises a browser application, a chat application, and a reading application.

According to another embodiment of the present disclosure, before the detecting and obtaining an application opened by the mobile terminal, and determining whether the currently opened application is a preset application of a specified type, the method further includes:

setting a shortcut menu item on the mobile terminal in advance to automatically prompt whether to enable the screen magnification function when the preset application of the specified type is detected.

According to another embodiment of the present disclosure, the step of detecting and obtaining the application opened by the mobile terminal, and determining whether the currently opened application is the preset application of the specified type comprises:

real-time detecting an application opened by the mobile terminal; and comparing the currently-opened application with the preset application of the specified type to determine whether the currently-opened application is the preset application of the specified type.

According to another embodiment of the present disclosure, the step of obtaining the distance from the user's face to the screen of the mobile terminal when the currently opened application is the preset application of the specified type comprises:

when the currently opened application is the preset application of the specified type, turning on a front camera of the mobile terminal and setting the front camera to be in a low-power operation mode;

controlling the front camera to obtain a current picture of the mobile terminal, and obtaining and detecting the distance from the user's face to the screen of the mobile terminal;

determining whether the distance from the user's face to the screen of the mobile terminal is less than the predetermined distance.

According to another embodiment of the present disclosure, the step of determining whether the distance from the user's face to the screen of the mobile terminal is less than the predetermined distance comprises:

when the distance from the user's face to the screen of the mobile terminal is greater than or equal to the predetermined distance, waiting for a predetermined time to perform a next detection to detect the distance from the user's face to the screen of the mobile terminal.

According to another embodiment of the present disclosure, the step of automatically prompting whether to enable the screen magnification function when the distance from the user's face to the screen of the mobile terminal is less than the predetermined distance comprises:

when the distance between the user's face and the screen of the mobile terminal is less than the predetermined distance, automatically popping up a floating window to prompt whether to enable the screen magnification function, and displaying an operation selection button of yes and no in the floating window.

According to an embodiment of the present disclosure, a screen magnification processing device based on a mobile terminal is disclosed. The screen magnification processing device includes:

a detection and determination module, configured to detect and obtain an application opened by the mobile terminal, and determine whether the currently opened application is a preset application of a specified type;

a distance detection module, configured to obtain a distance from a user's face to a screen of the mobile terminal when the currently opened application is the preset application of the specified type;

a magnification prompting module, configured to automatically prompt whether to enable a screen magnification function when the distance from the user's face to the screen of the mobile terminal is less than a predetermined distance;

a magnification controlling module, configured to control the mobile terminal screen to display a magnified image in a predetermined magnification rate when the user selects to enable the screen magnification function.

According to an embodiment of the present disclosure, a mobile terminal includes a memory, a processor, and a computer program stored in the memory and executable by the processor. The processor executes the computer program to perform the steps of the screen magnification processing method.

According to an embodiment of the present disclosure, a computer readable storage medium storing a computer program. A processor executes the computer program to perform the steps of the screen magnification processing method.

BENEFICIAL EFFECT OF THE PRESENT DISCLOSURE

Advantageous Effect

Compared with the prior art, the present disclosure is directed to a screen magnification processing method based on a mobile terminal. The method comprises: detecting and obtaining an application opened by the mobile terminal, and determining whether the currently opened application is a preset application of a specified type; when the currently opened application is the preset application of the specified type, obtaining a distance from a user's face to a screen of the mobile terminal; when the distance from the user's face to the screen of the mobile terminal is less than a predetermined distance, automatically prompting whether to enable a screen magnification function; when the user selects to enable the screen magnification function, controlling the mobile terminal screen to display a magnified image in a predetermined magnification rate. The present disclosure uses the front camera of the mobile terminal to determine whether the current user is close to the screen, and when the user is close to the screen at a predetermined distance, a prompt pop up is automatically generated to enable the screen magnification function, which provides convenience for the user.

BRIEF DESCRIPTION OF DRAWINGS

Description of the Drawings

In order to more clearly illustrate the technical solutions in the embodiments of the present disclosure, the drawings required to be used in the description of the embodiments will be briefly introduced below, and it is obvious that the drawings described below are only some embodiments of the present disclosure, and for those skilled in the art, other drawings can be obtained according to these drawings without creative labor.

Figure 1:
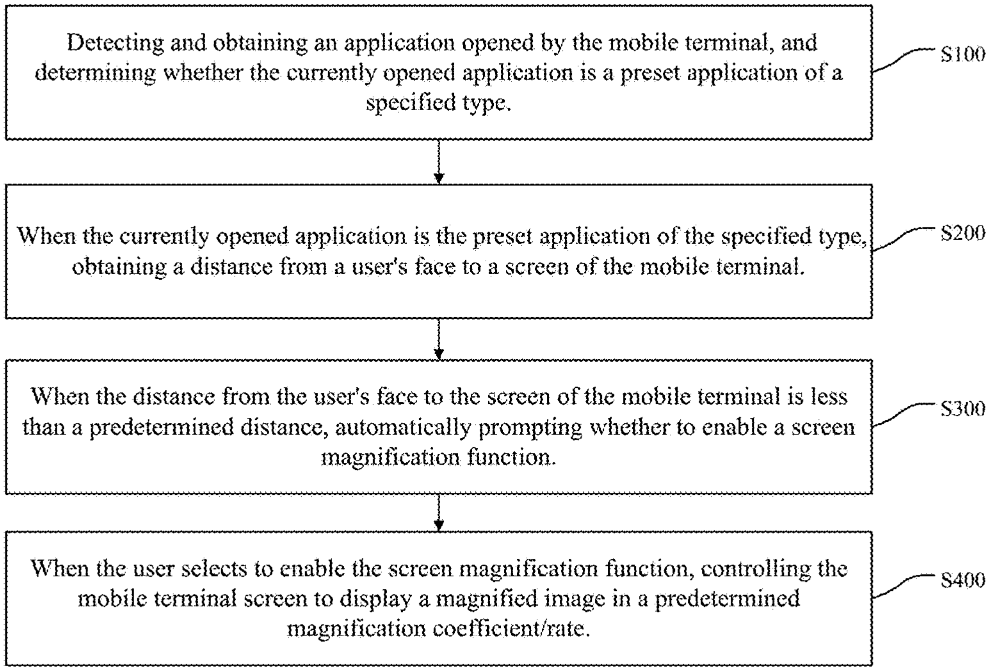

FIG. 1 is a flow chart of the screen magnification processing method based on a mobile terminal according to a first embodiment of the present disclosure.

Figure 2:
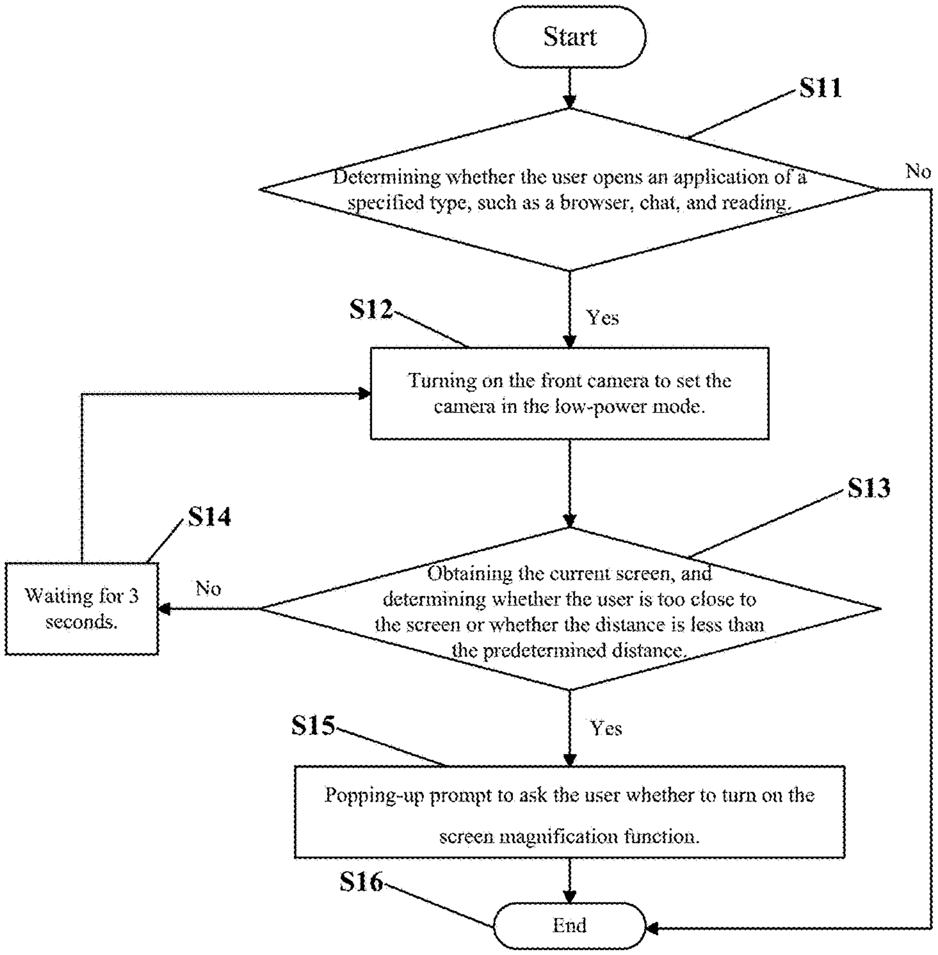

FIG. 2 is a flow chart of the screen magnification processing method of a mobile terminal according to a second embodiment of the present disclosure.

Figure 3:
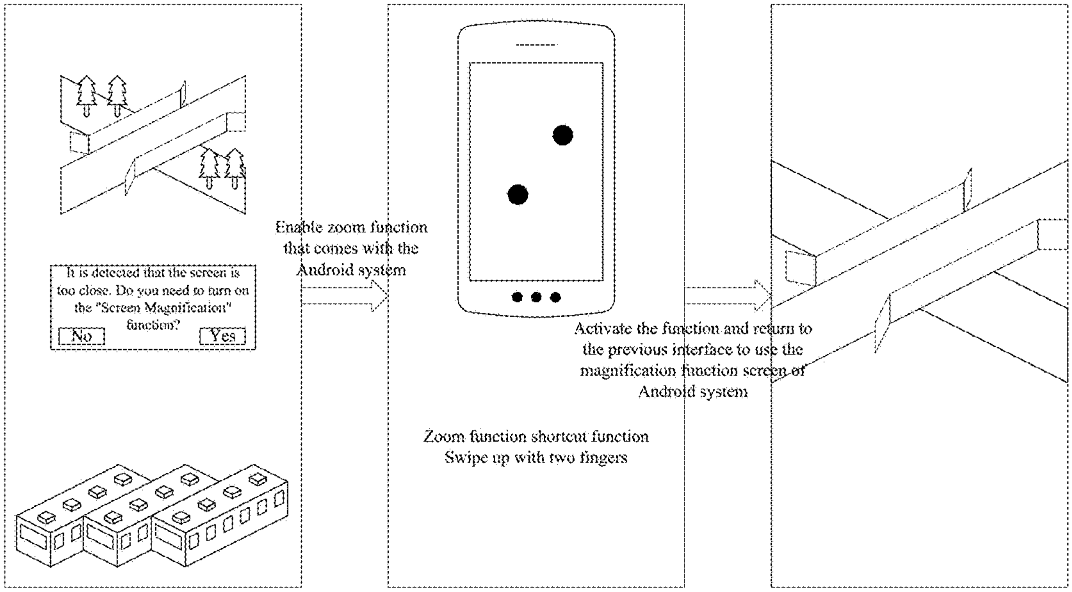

FIG. 3 is a schematic diagram showing the interface operation of the enlargement processing method according to an embodiment of the present disclosure.

Figure 4:
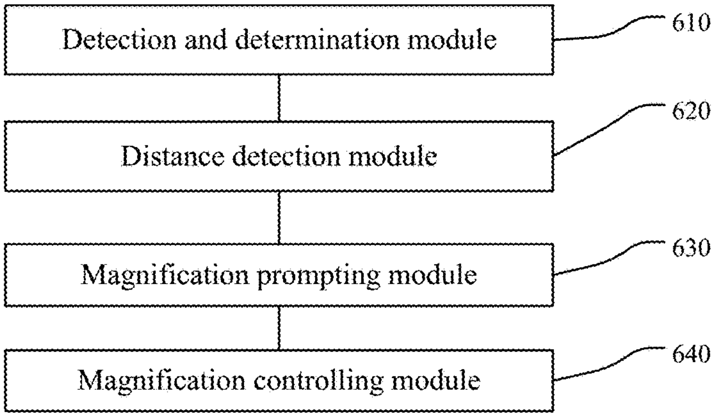

FIG. 4 is a functional block diagram of a screen magnification processing device based on a mobile terminal according to an embodiment of the present disclosure.

Figure 5:
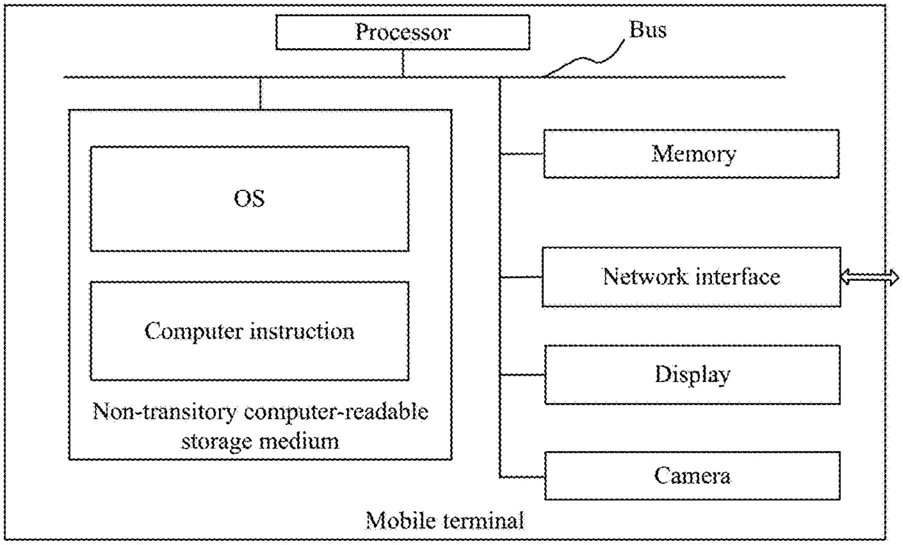

FIG. 5 is a functional block diagram of a mobile terminal according to an embodiment of the present disclosure.

EMBODIMENT OF THE PRESENT DISCLOSURE

Detailed Description of the Present Disclosure

In order to make the purpose, technical scheme and effect of the present disclosure clearer and more definite, the present disclosure is further described in detail below with reference to the accompanying drawings and embodiments. It should be understood that the specific embodiments described herein are used only to interpret the present disclosure and are not intended to qualify the present disclosure.

It should be noted that if there is a directional indication (such as upper, lower, left, right, front, rear, . . . , etc.) involved in the embodiment of the present disclosure, the directional indication is only used to explain the relative position relationship between the parts under a specific attitude (as shown in the attached drawing), the motion situation, etc., and if the specific attitude changes, the directional indication also changes accordingly.

In addition, if there are descriptions involving "first", "second", etc., in the embodiment of the present disclosure, the descriptions of "first", "second", etc., are only for descriptive purposes and cannot be construed as indicating or implying their relative importance or implying the number of technical features indicated. Thus, defining the "first" and "second" features may explicitly or implicitly include at least one of those features. In addition, the technical solutions between the various embodiments may be combined with each other, but only on the basis that they can be realized by a person skilled in the art, and when the combination of technical solutions contradicts or cannot be realized, it shall be deemed that the combination of such technical solutions does not exist and is not within the scope of protection claimed in the present disclosure.

With the development of science and technology and the continuous improvement of people's living standards, the use of various mobile terminals such as mobile phones is becoming more and more popular, and mobile phones have become an indispensable communication and entertainment tool in people's lives.

People often use mobile browser applications, chat applications, reading applications, etc. With the aging of society, when the mobile phone user is an elderly person with poor eyesight, some pages often have to be close to the elderly to see clearly. As previously mentioned, the conventional mobile terminal has a screen magnification function. For example, the Android system comes with an accessibility function, which allows the user to quickly enlarge the screen so that the content is displayed more clearly. Furthermore, this enabling entrance of this function is generally in "settings-accessibility/accessibility-magnification function", and the magnification function menu is hidden deeply, is not easy to use, and is inconvenient especially for the elderly to operate.

In order to solve the above issue, according to an embodiment of the present disclosure, a screen magnification processing method based on a mobile terminal is disclosed. The face detection of the camera can be used to detect whether the user is too close to the screen. When the user is far away from the screen, the face area will only occupy a small part of the camera screen. But if the user is very close to the screen, the face area will occupy the vast majority of the screen, when the distance between the user's face and the mobile terminal screen is less than the predetermined distance, then the mobile terminal automatically prompt whether to turn on the screen magnification function. When the command to select the screen magnification function is detected, then the mobile terminal screen is controlled to enlarge and display according to the predetermined coefficient/rate. The present disclosure adds a new function to the mobile terminal: it has the function of automatically controlling the screen of the mobile terminal to enlarge the display according to the predetermined coefficient/rate according to the need, which is more convenient for the user and improves the user experiences.

EXEMPLARY EMBODIMENTS

The First Embodiment

As shown in FIG. 1, according to an embodiment, a screen magnification processing method based on a mobile terminal is disclosed. The screen magnification processing method can be used in a mobile terminal, such as mobile phones and tablets. The method comprises a step S100, a step S200, a step S300 and a step S400.

Step S100: detecting and obtaining an application opened by the mobile terminal, and determining whether the currently opened application is a preset application of a specified type.

In this embodiment, a mobile phone is used as an example for illustration. Often some users have poor eyesight, and need to get very close to the mobile phone, so the application is provided with the function of automatically controlling the mobile terminal screen to enlarge the display according to the predetermined coefficient/rate according to the needs. This could allow the user to read automatically-enlarged information and is easier for the user to view the information.

Before Step S100, it is necessary to set up an application of a specific type on the mobile terminal in advance. The application of the specific type includes a browser application, a chat application, and a reading application. That is, when an application of a specific type is opened, the function of automatically controlling the mobile terminal screen to be enlarged according to a predetermined coefficient/rate is enabled as needed. Generally, users need to read a lot of words in browser applications, chat applications, and reading applications, so the auto-magnification function is turned on to facilitate users to read.

The mobile terminal is pre-configured in advance to automatically prompt a shortcut menu item on the mobile terminal to check whether to enable the screen magnification function when the application of the specific type is detected. That is, in this embodiment, there is no need to frequently set whether to turn on the screen magnification function (the function of automatically controlling the mobile terminal screen to enlarge the display according to a predetermined coefficient as needed), and the application is pre-configured to automatically pop up a dialog box according to the application type of the application currently-used by the user to remind the user whether to turn on the screen magnification function. It is very user-friendly, especially for the elderly, and it is very convenient for the elderly to use.

The mobile phone could real-time detect the applications currently-opened on the mobile terminal, and compare the currently-opened applications with the preset applications of the specified type to determine whether the currently-opened applications are the preset applications of the specified type. That is, this step is to determine whether the currently-opened application is the specified application that the user has pre-set, such as browser application, chat application, and reading application, which needs to read a large number of words. If yes, then go to Step S200.

Step S200: when the currently opened application is the preset application of the specified type, obtaining a distance from a user's face to a screen of the mobile terminal.

If the currently opened application is the preset application of the specified type, the function of automatically controlling the mobile terminal screen to enlarge the display according to a predetermined coefficient/rate will be automatically enabled as needed, and the distance from the user's face to the mobile terminal screen will be automatically obtained.

If the currently opened application is the preset application of the specific type, such as a browser application, a chat application, or a reading application, the front camera of the mobile terminal is turned on and the front camera is set to be in a low-power operation mode. The front camera is controlled to obtain the current screen of the mobile terminal, and the distance from the user's face to the screen of the mobile terminal is detected. Furthermore, whether the distance from the user's face to the screen of the mobile terminal is less than the predetermined distance is determined. For example, the mobile terminal could determine whether the straight-line distance between the user's face and the screen of the mobile terminal is less than 20 cm. In this embodiment, the distance from the user to the screen can be detected by the front camera in the low-power mode, which is more power-saving. Low-power mode: specifically, the power consumption can be reduced by reducing the frame rate and output size of the front camera's sensor, for example, the front camera in the low power mode can only obtain a simple image of the user's face contour to determine the straight-line distance from the user's face to the mobile terminal's screen.

If the distance between the user's face and the screen of the mobile terminal is determined to be less than the predetermined distance (20 cm), then go to Step S300.

If the distance between the user's face and the screen of the mobile terminal is determined to be greater than or equal to the predetermined distance, the mobile terminal is controlled to wait for a predetermined time to perform the next detection to continue to detect the distance between the user's face and the screen of the mobile terminal.

Step S300: when the distance from the user's face to the screen of the mobile terminal is less than a predetermined distance, automatically prompting whether to enable a screen magnification function.

When the distance between the user's face and the screen of the mobile terminal is less than the predetermined distance, the screen magnification function will be automatically prompted. For example, when a user opens a specified type of application on a mobile phone, such as a browser application, a chat application, or a reading application, and detects that the distance between the user's face and the mobile terminal screen is less than the predetermined distance (20 cm), a floating window will automatically pop up to prompt whether to enable the screen magnification function, and the yes or no operation selection button will be displayed in the floating window.

In this embodiment, the distance between the user's face and the screen of the mobile terminal can be determined by using a front camera with a motor that can focus, and the distance of the camera to the focus point can be used to determine the distance. This scheme can determine the distance more accurately.

In this embodiment, the floating winder is used to prompt whether to turn on the screen magnification function. This is more convenient for users to view and open as needed in a timely manner, so as to provide convenience for users. The predetermined distance of this embodiment can also be set and adjusted as needed, such as 15 cm or 10 cm, etc., so that it is convenient to set accordingly according to different user groups.

Step S400: when the user selects to enable the screen magnification function, controlling the mobile terminal screen to display a magnified image in a predetermined magnification coefficient/rate.

When it is detected that the user has opened an application of a specified type, and it is detected that the eyes of the user's face are closer to the screen than a predetermined distance (for example, 20 cm), and it is considered that it is difficult for the user to look at the mobile phone in the current display state of the mobile phone. Then, the mobile terminal will automatically enable the screen magnification function as needed, and the interface font of the current display screen of the mobile terminal will be enlarged according to the predetermined coefficient/rate. It is convenient for users to read more clearly and provides convenience for users to use.

For the convenience of the user, when the user opens the application of the specified type, after the mobile terminal screen is enlarged according to the predetermined coefficient, the user view is completed, and the user is detected to close the specified application, the mobile terminal will automatically control its screen back to display in the original display state before magnification without the user's manual operation. This is simple and convenient. This present disclosure could ease the use of mobile phones by the elderly, and can achieve accessibility functions: assist them in using mobile phones, and this series of functions include screen text reading, screen magnification function, etc.

In the following disclosure, the implementation of the process is further illustrated in more details.

As shown in FIG. 2, a screen magnification processing method based on a mobile terminal in the embodiment of the present disclosure comprises the following steps:

Step S10: start. Then to go Step S11;

Step S11: determining whether the user opens an application of a specified type, such as a browser, chat, and reading. If yes, then go to Step S12; otherwise, go to Step S16.

Step S12: turning on the front camera, set the camera in the low-power mode, and go to Step S13;

Step S13: obtaining the current screen, and determining whether the user is too close to the screen or whether the distance is less than the predetermined distance? If yes, go to Step S15; otherwise, go to Step S14.

In this embodiment, the face detection of the camera can be used to detect whether the user is too close to the screen, and when the user is far away from the screen, the face area will only occupy a small part of the camera screen; if the user is very close to the screen, the face area will occupy the vast majority of the screen, for example, the application may set the user's face to occupy more than 80% of the screen and it is considered too close, then the control starts to turn on the screen magnification function. In this embodiment, the present disclosure uses camera to detect the user's face in the screen. This is very cost effective because and there are many publically available models of cameras, which are at low cost.

In this embodiment, the mobile terminal can determine whether the current user is very close to the screen by calculating the proportion of the face position occupying the image captured by the front camera.

The pseudocode is as follows:

```
ratio=(face·width*face·height)/
  (image·width*image·height);
if (ratio>threshold)
too close to screen
```

The screen magnification feature can be implemented with Android's built-in accessibility features.

In this embodiment, the present disclosure could determine whether the user's face is too close to the screen by detecting the proportion of the user's face on the screen. This detection is very simple and convenient and can be realized in the low-power mode of the camera, which does not occupy more memory and provides convenience for the user.

Step S14: waiting for 3 seconds, and return to Step S13;

Step S15: popping-up prompt to ask the user whether to turn on the screen magnification function, and go to Step S16;

Specifically, as shown in FIG. 3, the left figure of FIG. 3 shows that the mobile terminal pops up a dialog box prompt when the user is detected to be too close to the screen. The dialog box is used for the user to input whether the user wants to turn on the screen magnification function. The user can choose Yes or No. If the user choose Yes, the mobile terminal could automatically enter the middle of FIG. 3 to display the shortcut of magnification function, and finally display the rightmost picture of FIG. 3, which shows a scaled-up picture in a predetermined magnification coefficient/rate.

Step S16: end.

Through the embodiment of the present disclosure, the gap of the automatic triggering magnification function mechanism is filled, and the user experience of the "accessibility function" of the Android system is improved. The "screen magnification" module can be directly implemented with the "accessibility features" embedded in the Android system. This could minimize the development effort.

Exemplary Device:

As shown in FIG. 4, according to an embodiment of the present disclosure, a screen magnification processing device based on a mobile terminal is disclosed. The screen magnification processing device comprises: a detection and determination module 610, a distance detection module 620, a magnification prompting module 630 and a magnification controlling module 640.

The detection and determination module 610 is configured to detect and obtain an application opened by the mobile terminal, and determine whether the currently opened application is a preset application of a specified type.

The distance detection module 620 is configured to obtain a distance from a user's face to a screen of the mobile terminal when the currently opened application is the preset application of the specified type.

The magnification prompting module 630 is configured to automatically prompt whether to enable a screen magnification function when the distance from the user's face to the screen of the mobile terminal is less than a predetermined distance.

The magnification controlling module 640 is configured to control the mobile terminal screen to display a magnified image in a predetermined magnification rate when the user selects to enable the screen magnification function.

According to an embodiment, a mobile terminal is disclosed. As shown in FIG. 5, the mobile terminal includes a processor, a memory, a network interface, a display, and a camera connected via a system bus. Here, the processor of the mobile terminal is used to provide computing and control capabilities. The memory of the mobile terminal includes a non-volatile storage medium and internal memory. This non-volatile storage medium stores the operating system and computer programs. This internal memory provides the environment for the operation of operating systems and computer programs in the non-volatile storage medium. The network interface of the mobile terminal is used for communicating with external terminals through network connections. When the computer program is executed by the processor, it realizes the aforementioned screen magnification process based on a mobile terminal. The display of the mobile terminal can be either an LCD screen or an e-ink display. The camera includes a front camera.

Please note, the elements shown in FIG. 5 should be regarded as an example, not a limitation of the present disclosure. In the actual implementation, the mobile terminal may include more or fewer parts, or combine certain parts or have different parts arranged. These changes all fall within the scope of the present disclosure.

In an embodiment, the mobile terminal comprises a memory, a processor and a screen magnification processing program based on a mobile terminal. The screen magnification processing program is stored in the memory and is loaded and executed by the processor to perform the operations comprising:

detecting and obtaining an application opened by the mobile terminal, and determining whether the currently opened application is a preset application of a specified type;

when the currently opened application is the preset application of the specified type, obtaining a distance from a user's face to a screen of the mobile terminal;

when the distance from the user's face to the screen of the mobile terminal is less than a predetermined distance, automatically prompting whether to enable a screen magnification function;

when the user selects to enable the screen magnification function, controlling the mobile terminal screen to display a magnified image in a predetermined magnification rate.

The operation of detecting and obtaining an application opened by the mobile terminal, and determining whether the currently opened application is a preset application of a specified type, comprises:

setting the preset application of the specified type on the mobile terminal in advance, wherein the preset application of the specified type comprises a browser application, a chat application, and a reading application.

The operation of detecting and obtaining an application opened by the mobile terminal, and determining whether the currently opened application is a preset application of a specified type, comprises:

setting a shortcut menu item on the mobile terminal in advance to automatically prompt whether to enable the screen magnification function when the preset application of the specified type is detected.

The operation of detecting and obtaining the application opened by the mobile terminal, and determining whether the currently opened application is the preset application of the specified type comprises:

real-time detecting an application opened by the mobile terminal;

comparing the currently-opened application with the preset application of the specified type to determine whether the currently-opened application is the preset application of the specified type.

The operation of obtaining the distance from the user's face to the screen of the mobile terminal when the currently opened application is the preset application of the specified type comprises:

when the currently opened application is the preset application of the specified type, turning on a front camera of the mobile terminal and setting the front camera to be in a low-power operation mode;

controlling the front camera to obtain a current picture of the mobile terminal, and obtaining and detecting the distance from the user's face to the screen of the mobile terminal;

determining whether the distance from the user's face to the screen of the mobile terminal is less than the predetermined distance.

The operation of determining whether the distance from the user's face to the screen of the mobile terminal is less than the predetermined distance comprises:

when the distance from the user's face to the screen of the mobile terminal is greater than or equal to the predetermined distance, waiting for a predetermined time to perform a next detection to detect the distance from the user's face to the screen of the mobile terminal.

The operation of automatically prompting whether to enable the screen magnification function when the distance from the user's face to the screen of the mobile terminal is less than the predetermined distance comprises:

when the distance between the user's face and the screen of the mobile terminal is less than the predetermined distance, automatically popping up a floating window to prompt whether to enable the screen magnification function, and displaying an operation selection button of yes and no in the floating window.

A person skilled in the art may understand that all or part of the process in the method for realizing the above embodiments can be completed by instructing the relevant hardware through a computer program. The computer program may be stored in a non-volatile computer-readable storage medium, and may include a flow such as the embodiments of each of the methods when executed. Any reference to memory, storage, database, or other medium used in each embodiment provided in the present disclosure may include non-volatile and/or volatile memory. Non-volatile memory can include read-only memory (ROM), programmable ROM (PROM), electrically programmable ROM (EPROM), electrically erasable programmable ROM (EEPROM), or flash memory. Volatile memory may include random access memory (RAM) or external cache memory. As an illustration rather than a limitation, RAM is available in a variety of forms, such as Static RAM (SRAM), Dynamic RAM (DRAM), Synchronous DRAM (SDRAM), Dual Data Rate SDRAM (DDRSDRAM), Enhanced SDRAM (ESDRAM), Synchlink DRAM (SLDRAM), Memory Bus (Rambus) Direct RAM (RDRAM), Direct Memory Bus Dynamic RAM (DRDRAM), and Memory Bus Dynamic RAM (RDRAM), etc.

In summary, the present disclosure is directed to a screen magnification processing method based on a mobile terminal. The method comprises: detecting and obtaining an application opened by the mobile terminal, and determining whether the currently opened application is a preset application of a specified type; when the currently opened application is the preset application of the specified type, obtaining a distance from a user's face to a screen of the mobile terminal; when the distance from the user's face to the screen of the mobile terminal is less than a predetermined distance, automatically prompting whether to enable a screen magnification function; when the user selects to enable the screen magnification function, controlling the mobile terminal screen to display a magnified image in a predetermined magnification rate. The present disclosure uses the front camera of the mobile terminal to determine whether the current user is close to the screen, and when the user is close to the screen at a predetermined distance, a prompt pop up is automatically generated to enable the screen magnification function, which provides convenience for the user.

The above are specific embodiments of the present disclosure, but the claimed scope of the present disclosure is not limited thereto. Those skilled in the art can easily think of various equivalent modifications or replacements within the technical scope disclosed in the present disclosure. These modifications or replacements should be covered by the claimed scope of the present disclosure. Therefore, the claimed scope of the present disclosure should be determined by claims.

What is claimed is:

1. A screen magnification processing method based on a mobile terminal, the method comprising:

detecting and obtaining an application opened by the mobile terminal;

determining whether the currently opened application is a preset application of a specified type;

in response to determining that the currently opened application is the preset application of the specified type, obtaining a distance from a user's face to a screen of the mobile terminal;

determining whether the distance from the user's face to the screen of the mobile terminal is less than a predetermined distance;

in response to determining that the distance from the user's face to the screen of the mobile terminal is less than the predetermined distance, automatically popping up a floating window to prompt whether to enable a screen magnification function, and displaying an operation selection button of yes and no in the floating window; and in response to receiving a user selection for enabling the screen magnification function, controlling the mobile terminal screen to display a magnified image in a predetermined magnification rate.

2. The method of claim 1, wherein before the detecting and obtaining an application opened by the mobile terminal, and determining whether the currently opened application is a preset application of a specified type, the method further comprises:

setting the preset application of the specified type on the mobile terminal in advance, wherein the preset application of the specified type comprises a browser application, a chat application, and a reading application.

3. The method of claim 2, wherein before the detecting and obtaining an application opened by the mobile terminal, and determining whether the currently opened application is a preset application of a specified type, the method further comprises:

setting a shortcut menu item on the mobile terminal in advance to automatically prompt whether to enable the screen magnification function when the preset application of the specified type is detected.

4. The method of claim 1, wherein the step of detecting and obtaining the application opened by the mobile terminal, and determining whether the currently opened application is the preset application of the specified type comprises:

real-time detecting an application opened by the mobile terminal; and comparing the currently-opened application with the preset application of the specified type to determine whether the currently-opened application is the preset application of the specified type.

5. The method of claim 1, wherein the step of obtaining the distance from the user's face to the screen of the mobile terminal when the currently opened application is the preset application of the specified type comprises:

in response to determining that the currently opened application is the preset application of the specified type, turning on a front camera of the mobile terminal and setting the front camera to be in a low-power operation mode;

controlling the front camera to obtain a current picture of the mobile terminal, and obtaining and detecting the distance from the user's face to the screen of the mobile terminal; and determining whether the distance from the user's face to the screen of the mobile terminal is less than the predetermined distance.

6. The method of claim 5, wherein the step of determining whether the distance from the user's face to the screen of the mobile terminal is less than the predetermined distance comprises:

in response to determining that the distance from the user's face to the screen of the mobile terminal is greater than or equal to the predetermined distance, waiting for a predetermined time to perform a next detection to detect the distance from the user's face to the screen of the mobile terminal.

7. The method of claim 1, wherein the predetermined distance is 20 centimeters, 15 centimeters, or 10 centimeters.

8. The method of claim 1, wherein the step of obtaining the distance from the user's face to the screen of the mobile terminal comprises:

detecting the distance from the user's eye to the screen of the mobile terminal.

9. The method of claim 1, further comprising:

in response to detecting the preset application of the specified type to be closed, controlling the screen of the mobile terminal to display in a previous predetermined magnification rate before displaying the magnified image.

10. A mobile terminal, comprising a memory, a processor, and a computer program stored in the memory and executable by the processor, wherein the processor executes the computer program to perform operations comprising:

detecting and obtaining an application opened by the mobile terminal, and determining whether the currently opened application is a preset application of a specified type;

when the currently opened application is the preset application of the specified type, obtaining a distance from a user's face to a screen of the mobile terminal;

when the distance from the user's face to the screen of the mobile terminal is less than a predetermined distance, automatically popping up a floating window to prompt whether to enable a screen magnification function, and displaying an operation selection button of yes and no in the floating window; and when the user selects to enable the screen magnification function, controlling the mobile terminal screen to display a magnified image in a predetermined magnification rate.

11. The mobile terminal of claim 10, wherein before the detecting and obtaining an application opened by the mobile terminal, and determining whether the currently opened application is a preset application of a specified type, the method further comprises:

setting the preset application of the specified type on the mobile terminal in advance, wherein the preset application of the specified type comprises a browser application, a chat application, and a reading application.

12. The mobile terminal of claim 11, wherein before the detecting and obtaining an application opened by the mobile terminal, and determining whether the currently opened application is a preset application of a specified type, the method further comprises:

setting a shortcut menu item on the mobile terminal in advance to automatically prompt whether to enable the screen magnification function when the preset application of the specified type is detected.

13. The mobile terminal of claim 10, wherein the operation of detecting and obtaining the application opened by the mobile terminal, and determining whether the currently opened application is the preset application of the specified type comprises:

real-time detecting an application opened by the mobile terminal; and comparing the currently-opened application with the preset application of the specified type to determine whether the currently-opened application is the preset application of the specified type.

14. The mobile terminal of claim 10, wherein the operation of obtaining the distance from the user's face to the screen of the mobile terminal when the currently opened application is the preset application of the specified type comprises:

when the currently opened application is the preset application of the specified type, turning on a front camera of the mobile terminal and setting the front camera to be in a low-power operation mode;

controlling the front camera to obtain a current picture of the mobile terminal, and obtaining and detecting the distance from the user's face to the screen of the mobile terminal; and determining whether the distance from the user's face to the screen of the mobile terminal is less than the predetermined distance.

15. The mobile terminal of claim 14, wherein the operation of determining whether the distance from the user's face to the screen of the mobile terminal is less than the predetermined distance comprises:

when the distance from the user's face to the screen of the mobile terminal is greater than or equal to the predetermined distance, waiting for a predetermined time to perform a next detection to detect the distance from the user's face to the screen of the mobile terminal.

16. A non-transitory computer readable storage medium storing a computer program, wherein a processor executes the computer program to perform operations comprising:

detecting and obtaining an application opened by the mobile terminal, and determining whether the currently opened application is a preset application of a specified type;

when the currently opened application is the preset application of the specified type, obtaining a distance from a user's face to a screen of the mobile terminal;

when the distance from the user's face to the screen of the mobile terminal is less than a predetermined distance, automatically popping up a floating window to prompt whether to enable a screen magnification function, and displaying an operation selection button of yes and no in the floating window; and when the user selects to enable the screen magnification function, controlling the mobile terminal screen to display a magnified image in a predetermined magnification rate.

17. The non-transitory computer readable storage medium of claim 16, wherein before the detecting and obtaining an application opened by the mobile terminal, and determining whether the currently opened application is a preset application of a specified type, the method further comprises:

setting the preset application of the specified type on the mobile terminal in advance, wherein the preset application of the specified type comprises a browser application, a chat application, and a reading application.

18. The non-transitory computer readable storage medium of claim 17, wherein before the detecting and obtaining an application opened by the mobile terminal, and determining whether the currently opened application is a preset application of a specified type, the method further comprises:

setting a shortcut menu item on the mobile terminal in advance to automatically prompt whether to enable the screen magnification function when the preset application of the specified type is detected.

* * * * *